US010091270B2

(12) United States Patent
Fang (10) Patent No.: US 10,091,270 B2
(45) Date of Patent: Oct. 2, 2018

(54) METHOD AND SYSTEM FOR ALLOWING CLOUD-BASED APPLICATIONS TO AUTOMATICALLY INTEGRATE NETWORK ENABLED SENSORS DURING RUNTIME

(71) Applicant: SafeNet International LLC, Arlington Heights, IL (US)

(72) Inventor: Joseph Y. Fang, South Barrington, IL (US)

(73) Assignee: Safenet International LLC, Arlington Heights, IL (US)

( * ) Notice: Subject to any disclaimer, the term of this patent is extended or adjusted under 35 U.S.C. 154(b) by 238 days.

(21) Appl. No.: 15/074,123

(22) Filed: Mar. 18, 2016

(65) Prior Publication Data

US 2016/0315816 A1    Oct. 27, 2016

Related U.S. Application Data

(60) Provisional application No. 62/151,393, filed on Apr. 22, 2015.

(51) Int. Cl.
| G06F 15/16 | (2006.01) |
| H04L 29/08 | (2006.01) |
| H04L 12/24 | (2006.01) |
| H04W 4/70 | (2018.01) |

(52) U.S. Cl.
CPC .......... H04L 67/02 (2013.01); H04L 41/022 (2013.01); H04L 41/0856 (2013.01); H04W 4/70 (2018.02)

(58) Field of Classification Search
CPC ... H04L 67/02; H04L 41/022; H04L 41/0856; H04W 4/005

USPC .......................................... 709/217–219, 237
See application file for complete search history.

(56) References Cited

U.S. PATENT DOCUMENTS

| 6,633,910 | B1 | 10/2003 | Rajan et al. |
| 7,178,096 | B2 | 2/2007 | Rangan et al. |
| 8,060,074 | B2 | 11/2011 | Danford et al. |
| 8,296,178 | B2 | 10/2012 | Hudis et al. |
| 8,761,101 | B1 | 6/2014 | Crosbie et al. |
| 8,769,131 | B2 | 7/2014 | Pomerantz et al. |
| 9,037,711 | B2 | 5/2015 | Maida-Smith et al. |
| 9,092,701 | B2* | 7/2015 | Hughes ............ H04N 21/25825 |
| 2001/0000537 | A1 | 4/2001 | Inala et al. |
| 2002/0140547 | A1* | 10/2002 | Litwin, Jr. ............... G04G 7/00 |
| | | | 375/354 |
| 2004/0186690 | A1* | 9/2004 | Swanson ................. G06F 17/50 |
| | | | 702/187 |
| 2005/0193103 | A1 | 9/2005 | Drabik |
| 2010/0161759 | A1 | 6/2010 | Brand |
| 2012/0215898 | A1 | 8/2012 | Shah et al. |
| 2012/0240183 | A1 | 9/2012 | Sinha |
| 2014/0258231 | A1 | 9/2014 | Birk et al. |
| 2014/0278244 | A1* | 9/2014 | Humphrey ............. G01N 21/01 |
| | | | 702/182 |
| 2014/0289789 | A1 | 9/2014 | Poornachandran et al. |
| 2014/0337918 | A1 | 11/2014 | Siddiqi et al. |

(Continued)

*Primary Examiner* — Bharat N Barot
(74) *Attorney, Agent, or Firm* — Bishop Diehl & Lee, Ltd.

(57) ABSTRACT

A method and system to enable interoperability between Internet enabled devices and online applications without traditionally agreeable on device standard formats between the manufacturer and applications ahead time. The application is able to connect, control, and actuate newly added devices at runtime.

15 Claims, 5 Drawing Sheets

*The procedures how Internet based Application using System to adapt an unknown IoT device which has been registered*

(56) References Cited

U.S. PATENT DOCUMENTS

2015/0026343 A1    1/2015  Borges et al.
2016/0267443 A1\*  9/2016  Hisano ................... G06Q 10/30

\* cited by examiner

*Figure 1: Manufacturer registration procedures for new IoT device prior to Release*

*Figure 2: Command Structure Block*

*Figure 3: The procedures how Internet based Application using System to adapt an unknown IoT device which has been registered*

*Figure 4: The Architecture of the Realization Concept*

```
<?xml version="1.0" encoding="utf-8"?>

<root>

<application>http://api.sankai.com/Beijing_seniorhome/sem
proxy</application>
  <location>
    <city>Beijing</city>
    <zipcode>123456</zipcode>
  </location>
  <Category>Healthcare</Category>
  <query>HomeBaseUnit</query>
  <AppID></AppID>
  <UID>abcdefghijklmnopq</UID>
  <commandCode></commandCode>
</root>
```

*Figure 5: The Contents of HTTP "Get" Request from the Application to the System*

```
<?xml version="1.0" encoding="utf-8"?>

<root>
  <errcode>0</errcode>
  <query>HomeBaseUnit</query>
  <commandCode></commandCode>
  <SensorUID>40300000010002</SensorUID>
  <commandFormat>cmdFormat.xml</commandFormat>
  <Commands count="4">
    <commandCode>T1</commandCode>
    <parameter1>4</parameter1>
    <commandCode>T2</commandCode>
    <parameter1>4</parameter1>
    <parameter2>32</parameter2>
    <commandCode>S1</commandCode>
    <commandCode>S2</commandCode>
    <parameter1>4</parameter1>
    <parameter2>16</parameter2>
    <parameter3>32</parameter3>
    <parameter4>128</parameter4>
  </Commands>
</root>
```

*Figure 6: The Contents of HTTP "Post" Request from the System to the Application*

Figure 7 - *Command Definition as XML - comFormat.xml*

```xml
<?xml version="1.0"?>

<root>
  <ModelCategories>
    <Healthcare>SeniorCare</Healthcare>
  </ModelCategories>
  <DataStructure>Type1</DataStructure>
  <commProtocol>TCP</commProtocol>
  <commandFormat>ASCII</commandFormat>
  <Manufacturer>
    <Name>Hivisi</Name>
    <Address></Address>
    <Phone></Phone>
    <emailAddr></emailAddr>
    <sensorCategory></sensorCategory>
  </Manufacturer>
  <FormatExplanation>
    <verFmt>V1.0.0</verFmt>
    <uidLen unit="Bytes">32</uidLen>
    <keyEncryption>CRC16</keyEncryption>
    <dateFormat>MM:DD:YYYY</dateFormat>
    <timeFormat>HH:MM:SS</timeFormat>
    <timeZone>0600</timeZone>
    <typeDevices count ="4">
      <watch>1</watch>
      <bloodpressure>2</bloodpressure>
      <homebaseUnit>3</homebaseUnit>
      <medicalPendant>4</medicalPendant>
    </typeDevices>
    <Terminal count="4">T</Terminal>
    <Server count="2">S</Server>
    <parameters>4</parameters>
    <lengthCommand
unit="Bytes">1024</lengthCommand>
  </FormatExplanation>
  <cmdFormatOrder count ="10">
    <version>1</version>
    <UID>2</UID>
    <encryption>3</encryption>
    <checksum>4</checksum>
    <date>5</date>
    <time>6</time>
    <zone>7</zone>
    <termOrser>8</termOrser>
    <misCode>9</misCode>
    <param>10</param>
    <params count="4">
      <param1 unit="Bytes">4</param1>
      <param2 unit="Bytes">16</param2>
      <param3 unit="Bytes">32</param3>
      <param4 unit="Bytes">128</param4>
    </params>
  </cmdFormatOrder>
</root>
```

METHOD AND SYSTEM FOR ALLOWING CLOUD-BASED APPLICATIONS TO AUTOMATICALLY INTEGRATE NETWORK ENABLED SENSORS DURING RUNTIME

RELATED APPLICATION

The present application claims the filing priority of U.S. Provisional Application No. 62/151,393 titled "A METHOD ALLOWS CLOUD-BASED APPLICATIONS AUTOMATICALLY INTEGRATE NETWORK ENABLE SENSORS DURING RUNTIME" and filed on Apr. 22, 2015. The '393 Provisional Application is also hereby incorporated by reference.

BACKGROUND OF THE INVENTION

Physical objects and people can be equipped with networked sensors to connect to cloud-based computing systems (applications) which track and/or actuate an object's performance, environment information, location, and can track health status. This interrelation is what is meant by "Internet of Things" or IoT, and it is growing rapidly.

An estimated over 9 billion devices in the world are connected to the Internet, including computers, tablets and smartphones. According to a February 2013 estimate, that number is expected to increase to somewhere in the range of 50 billion to one trillion devices within the next decade. But all technical issues are not yet in place to support this growing pace. Device manufacturers need to agree on a standard or Application providers need to have a way to learn and adapt each sensor protocol. Until such interoperability between devices and cloud-based computing systems is widely available, IoT applications will require extra effort to build and maintain integrated system.

IoT devices can be of varied types including medical pendants, smart watches, LED lights, industrial machines covering areas of healthcare, wearable devices, home automation devices (e.g., appliances), smartphones, computers, Energy Grid systems, even Automobiles. They generate data in a form which is processed by data analytic systems in the Application which leads to logic information to guide further action locally or remotely. However, the data analytics systems in the Cloud cannot interpolate all data forms generated by every type of IoT device at this point. In order to do so, manufacturers will need to agree on a standard and share language that will enable interoperability between IoT devices and Application(s).

Broad standards in other technologies exist. For example, Digital Imaging and Communication in Medicine of DICOM is a standard for the medical imaging industry. It includes a file format and communication protocol. As long as manufactures follow the DICOM standard, the medical images they produce are able to display for diagnosis, handle, store, print, and transmit within hospitals and healthcare facilities around the World. Given such board range of IoT device categories, from a soil moisture monitor to a motion detector to a heartbeat measurer, a standard format and protocol to realize the full interoperability of IoT devices is not an easy undertaking. Not mention that the cost of IoT devices must fall to levels that can spark widespread use.

Until the invention of the present application, these and other problems in the prior art went either unnoticed or unsolved by those skilled in the art. Clearly, for at least the above reasons, the need to provide a global standard for all IoT devices is of great importance. The present invention solves these and other problems by providing a system and methods which reduce integration procedures an Application has to understand for any given IoT device command instruction, as well as data format, in order to control and actuate the device.

SUMMARY OF THE INVENTION

There is disclosed herein an improved system and methods which avoid the disadvantages of prior system and methods while affording additional structural and operating advantages.

This invention introduces a system—a dictionary like computing system server online to connect IoT devices and their online Applications at run time so that the Application is able to control and actuate these devices without knowing their command structures and data format. It reduces a integration procedure of which the Application has to understand IoT device command instruction and data format in order to control and actuate the device.

One side, it allows manufacturers to input their IoT devices' format and status definition along with their unique identifiers (UID) when devices are released. It builds dispatch command libraries which can be sorted by UID.

Another side, the system uses web service to take Hypertext Transfer Protocol (HTTP) get request from the Internet based Application in which the UID of the device instruction set is placed. The UID is used by the system to retrieve the functions of the instruction set of the device along with data format and/or parameters. The web services of the system then replies with HTTP post request with a complete device command function interface and parameter structures as Extensible Markup Language (XML)/JavaScript Object Notation (JSON) package. The Application is required to use these functions with the UID to get data and send control signal through the system to the IoT device. In addition to it, the system makes the Application totally transparent for IoT device upgrade and replace.

The system creates a set of functions with common interface based on the type of devices to wrap up commands and their parameter set based on the IoT device data format and status input by the Manufacturers, and builds it as a function library in the system. function names and parameter definitions and their containers (APIs) are packaged as XML/JSON format loaded up to the Application by HTTP post request after received the application HTTP get request via web services. We use this method to isolate the application from knowing IoT devices commands and their structures. At the same time, it allows the application effectively interoperate the IoT devices to build its solution with automatically adapt new devices without modifying its software. It can be extended for variety of types of IoT devices and their applications.

These and other aspects and objects of the invention will be more readily understood by a person of skill in the art from a reading of the following detailed description in combination with the appended drawing figures.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

FIG. 1 is a flow diagram demonstrating the first step of workflow—i.e., registering a new IoT device. Since new IoT devices can be in various categories and device types, the System offers user interface to handle domain information—model categories, IoT device type—data structure, in order to create data format according to the rule. The System creates a function library to wrap of each command and its parameters. The System maintains function library and build it in database which can be sorted by UID/URI.

FIG. 5 illustrates contents of an HTTP "get" request. The Application web service makes an HTTP "get" request to the System along with UID. The System is asked to provide function pointers of the control commands of the specific IoT device. The System extract UID and register the Application. It uses UID to retrieve the function for the IoT device and its command format XML file in which command detail can be learned.

FIG. 6 illustrates the contents of HTTP post request. The System web service make HTTP post request to the Application after received the request. It provides the function point of the required command and its parameters. It also include command format configuration for the Application programmatically extract and build their function call.

FIG. 7 is a table listing Command Definition as XML—comFormat.xml.

DETAILED DESCRIPTION OF PREFERRED EMBODIMENT

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Figure 2:
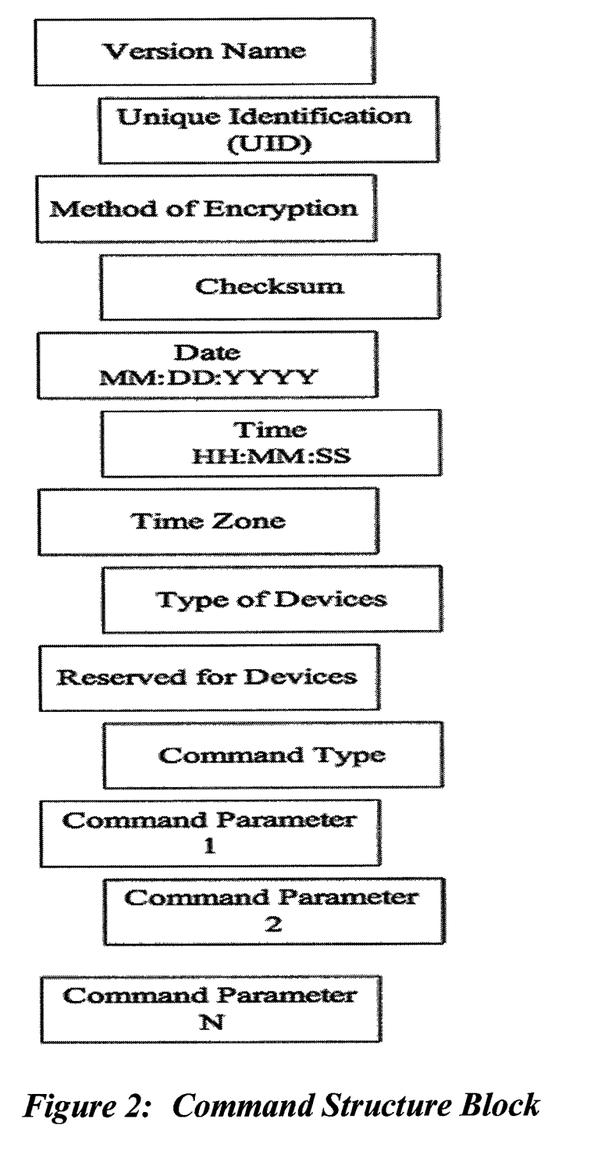
FIG. 2 is a block diagram which demonstrates the structure of each command of the IoT device.

With reference to FIG. 2, an IoT device preferably comprises each of the following features:
1. Embedded software version—it represents certain features and the date on the market for the IoT devices. System needs to dispatch to different function library possible.
2. Unique Identification (UID)—it is the ID for the IoT device. It must be unique in the Universal. It may combine our input and manufacture series number for the device.
3. Method of Encryption—it represents encryption format, such as 32 bit or 128 bit encryption.
4. Command Validation—it offers a way to self verify command correctness by adding up command hex value
5. Date (MM:DD:YYYY)—it presents the date the command issued
6. Time (HH:MM:SS)—it represents the time the command issued
7. Time Zone—it represents the uniform standard time region where the device located at
8. Type of Devices—Given the category, it may be "watch", "blood pressure instrument", or "step counter".
9. Reserved for Devices—it leave a container for the manufacture to use.
10. Command Type—it represents vary commands offered by the device. Two key categories are Terminal to Server commands and Server to Terminal commands.
11. Parameters—it represents the number of the parameters in the command and the size of each parameter, such as 4 byte or 128 bytes.

Figure 1:
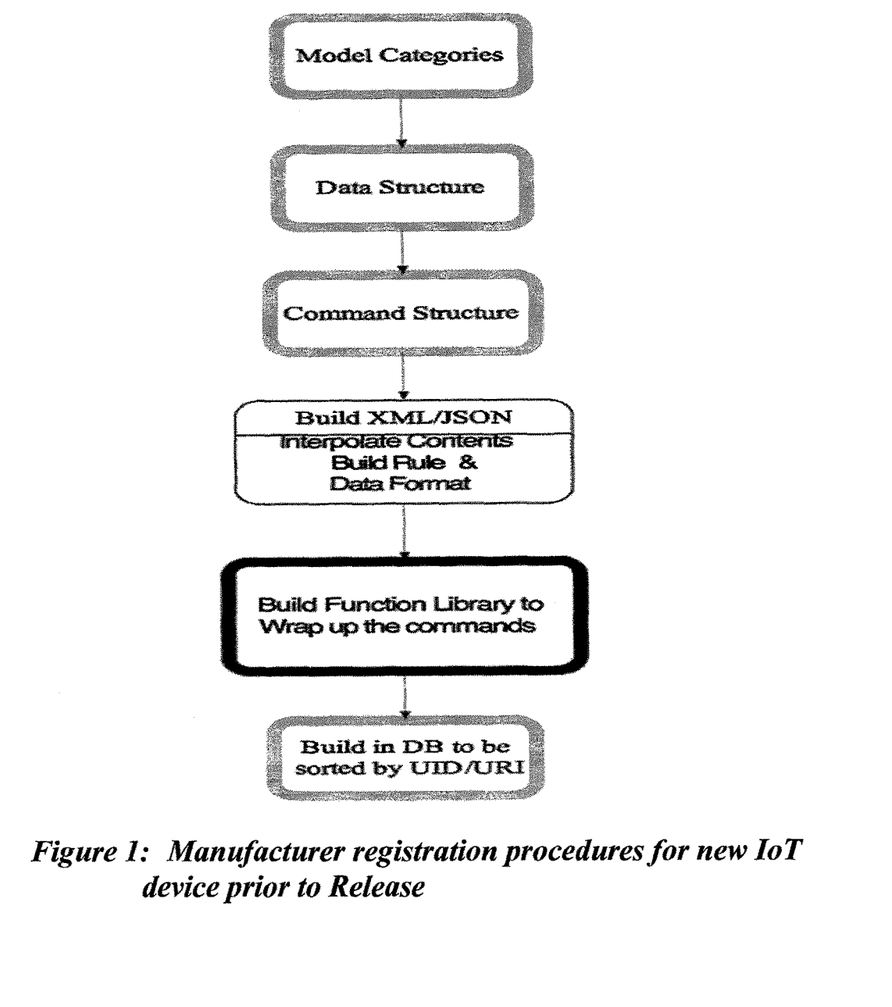
Figure 3:
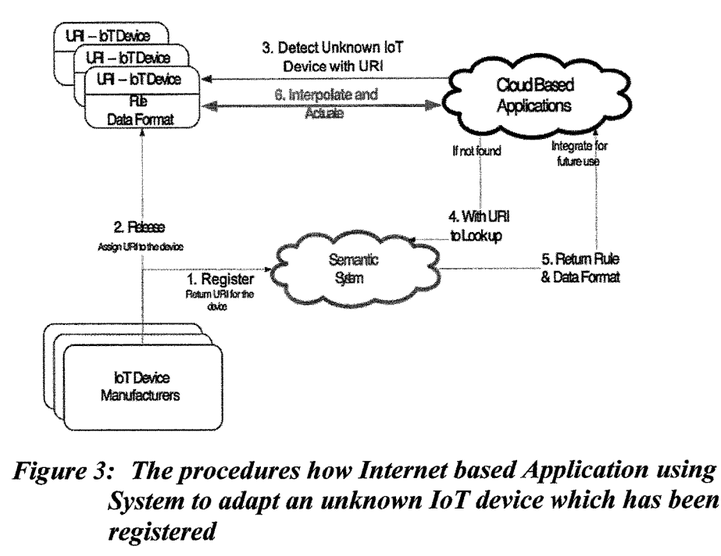
FIG. 3 is a demonstrates the procedures of how an Application automatically adapts an unknown IoT devices without directly interface with the manufacturer of IoT devices by using the System.
Figure 5:
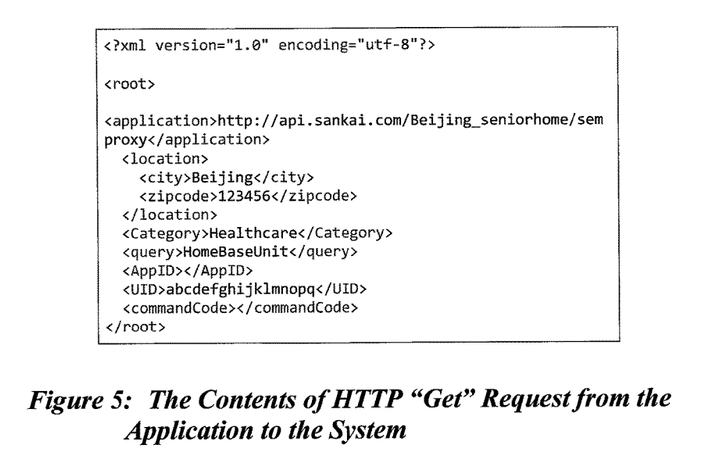
Figure 6:
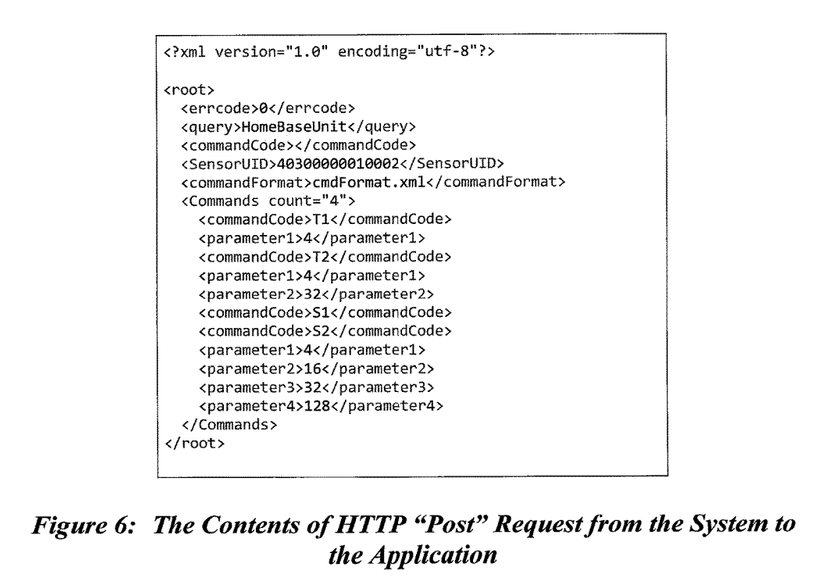

With reference to FIG. 3, the integration and use of a new IoT device is described below:
1. Manufacturer registers new IoT device in the System before introducing to the market (registration procedures are illustrated in FIG. 1);
2. After successful registration of the new device, manufacturer places a return UID into the device. The new device is ready to plug-in to the Internet for use;
3. The IoT device is purchased by a solution provider who combines the IoT device and an Application to provide a solution for a customer;
4. Manufacturer releases the unique identification (UID) of the IoT device to the solution provider;
5. The solution provider sends the UID to an Application provider. The Application is able to input the UID into its system via administration software interface. Due to not being previously integrated, the Application lists an unknown device internally;
6. The Application may use universal APIs with UID to control and actuate the devices or use an HTTP "get" request to the System for function point and parameter configuration (see FIG. 5);
7. The System will sort through its database by using UID. It returns the matching function pointer with parameter settings with an HTTP "post" request.
8. The Application completes integration for the new IoT device (see FIG. 6);
9. The Cloud based application is now able to acquire the device's data and actuate accordingly.

Figure 4:
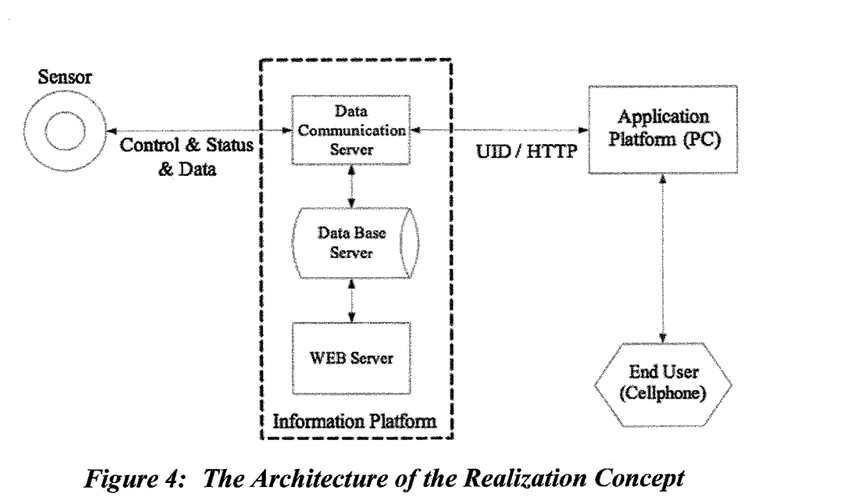
FIG. 4 is a schematic illustrating an embodiment of the architecture of realization concept.

With reference to FIG. 4, the architecture of the realization concept comprises the following components:
1. Data Communication Server—it communicate with the Application platform and IoT devices on the network. It takes manufacture input command information to convert each command to a function which wrap up the command and isolate the device command from the caller. The Server use HTTP get/post request to communicate with the Application so that the Application is able to use the function to call IoT devices rather use IoT device command via the System.
2. Database Server—it is storage unit where the command format and command function library (per device per version per manufacture) are stored. Each function can be sorted by UID. It will be uploaded to the Data Communication Server for execution.
3. Web Server—it offers web page for the manufacture to input their IoT device command structure. It also provides a feedback for the manufacture to verify their input information and commands.

Automated processing and interpretation of the IoT devices by an Application requires seamlessly accessible and process-able across Application and IoT devices. It includes common data format and exchange protocol to provide and describe the IoT devices data and instruction formats to be understand and known how to use by the Application at the run time. Instead of that asking each IoT devices provider follows the standard of the data formats and the exchange protocol which Application(s) are understood, a system provides a mechanism to take IoT device data. It systematically evaluates the aspects of IoT device, the source provider, device category, environment specific information associated to the IoT devices, functional information of the IoT devices, logic status, possible all combination of commands according to their data and instruction formats. It also considers the diversity of data types, device types and potential providers in the IoT domain. System, then, builds a function library to wrap up the commands and parameters. With the UID of each IoT device on the Network, these functions are able to control the targeted device and to obtain data from the device. Within the Function, System will deploy web services to obtain HTTP get request from the Application as XML/JSON format in which IoT device UID is included. According to the request, System uses HTTP post request to return a XML/JSON format file in which the function pointer(s), parameters' definition and holder are placed. The Application may use the same HTTP get request method to pass the function pointer with parameters to System as invoking the function call. System obtains the request and invokes the function. The feedback from IoT device including return status and controlled data are packaged by System as XML/JSON file format and uses HTTP post request to the Application. System can offer Application (s) a function library with universal APIs represent a type of devices so that Application(s) totally transparent to different manufacture devices.

Each step is described in the following sections in detail.

Model Categories

IoT devices are applied but not limited to the following categories:

Home Automation—monitor and control lights, security, temperature, and appliances Smartphone and Computers—global position, connection, data transfer, and applications Wearable Electronics—Apple watch, smart wrist-band Healthcare—imaging diagnosis system. Remote patient monitor, medical pendant, internet enable blood pressure monitor, etc.

Security and Surveillance Camera—web camera, Canary, and Piper;

Office and warehouse—printer, HVAC;

Industrial Machines—sensors detect deteriorating underground concert water pipe;

Energy System—smart electrical meter, smart grid, renewable energy system;

Automobiles—connected vehicle and intelligent transportation;

Retails—smart payments (using cellular to make payment), inventory management, smart vendor machine;

Environment—Weather monitoring (temperature, humidity, pressure etc.), air quality, noise pollution, fire detection, and flood detection;

Logistics—Transportation monitoring, fleet tracking, shipping monitoring, and remote vehicle diagnostics;

Agriculture—smart irrigation system to monitor soil moisture, green house control.

Model categories are used to distinguish these areas.

Data Structure

IoT devices provide monitoring and actuating as described in TABLE 1 below.

TABLE 1

| Type | Definition | Example |
|---|---|---|
| 1 | Single node that performs sensing and actuation locally. Data is transmitted to Cloud for store, retrieve, and display | Smart wrist band to measure heartbeat, count steps. Analysis and provide local notification. The device sends the heartbeat, steps and others to Cloud, with APPs customer can view anywhere |
| 2 | Single node that performs sensing and actuation locally and remotely. Data can be analyzed in Cloud. Application is Cloud-based | WeMo light switch - turn lights on and off from anywhere. Nest learning Thermostat. Monitor and control the house locally and remotely |
| 3 | Multi nodes that perform local collect data. Data is uploaded and stored in the Cloud. Application is Cloud based | Imaging systems such as PET/CT's utilization can be uploaded to Cloud. Cloud application can show schedule of each scanner. Doctor can reassign patients to other scanner during off peak time |
| 4 | Multi end nodes and one coordinate node. The end nodes that performs sensing and actuation locally. Coordinator node collects data from the end nodes and uploads to the Cloud. | Home automation system usually have multi end nodes such as motion sensor, contact sensors, thermostat sensors, surveillance camera, and one coordinate node such as Canary Home security system or Ethernet Gateway which connects to end nods. |
| 5 | Multi independent end nodes that performs sensing and actuation locally. Data is uploaded to the Cloud and Application is Cloud based | Security and surveillance camera can be viewed as independent end nodes and upload to Cloud for systematic display and monitor. |

Data structure is used to characterize IoT device types.

Command Structure Format

It is expected that every IoT device manufacturer follow the industry standard as NEMA Standards to manufactory its device. For example, a motion sensor, its rule to represent active or in-active is a standard regardless its motion detection system whether there are those with active sensors and those with passive sensors (defined at device type above). It consists of two set of command structures: 1) Terminal-to-Server command structure, and 2) Server-to-Terminal command structure. The command structure commonly consists of Version, UID, Method of Encryption, Checksum, Date, Time, Time Zone, Type of Devices, Command Types, Command Parameters as shown in Table 2 below. The command types include two different command structures (terminal/server) and a list of commands, such as:

[Version, UID, Encryption, Checksum, Date, Time, Time Zone, Type of Devices, Port/IMEI, Command Code, Param1, Param2, ... ]

Based on the command code, System may generate a list of commands based on all possible command codes when other elements in the command structure are confirmed; such as, Device online requests after each power on, Server responses Device's request, etc.

Based on the table below, an actual command may look like this:

[V1.0.0, a1d83kdeio3fg33k, 1, abcd, 07/21/2015, 10:15:33, 0800, 1, T1, 13912345678, V1.0]

Note:
Type of Device: assigned 1, means "Watch"
Param1: Terminal IMEI code
Param2: version of the embedded driver of the Watch

TABLE 2

| Itm | Command Structure | Comment/Example |
|---|---|---|
| 1 | Version Name | V1.0.0 |
| 2 | Unique Identification (UID) | ABCDEFGHIJKLMNOPQ ... |
| 3 | Method of Encryption | Standard |
| 4 | Checksum | Verification |
| 5 | Date | MM:DD:YYYY |
| 6 | Time | HH:MM:SS |
| 7 | Time Zone | 0800 (USA) |
| 8 | Type of Devices | Watch, Blood Pressure Measurement, Home Based Unit, Medical Pendant |
| 9 | Reserved for Devices | |
| 10 | Command Code | A group of commands including Terminal to Server and vis versa. It can be referenced by a command code |
| 11 | Command Parameter 1 | Either input or output value with vary length upon different command |
| 12 | Command Parameter 2 | Either input or output value with vary length upon different command |
| 13 | Command Parameter N | Either input or output value with vary length upon different command |

Manufacturer Input

Based on Model Categories, Data Structure, and Command Structure Format, the System offers manufacturer interface application. The application guides the manufacturer to input all necessary information so that it can build a command profile as XML in FIG. 7. With this, System is able to generate all possible commands according to the command code.

When a new IoT device registered in the System (by a manufacturer), it first identifies domain specific applications of IoT devices from model categories, obtain data structure by IoT device type, then build the data format based on inputs and the rule. It places the data format in the Cloud database managed by the System. The global sorting index of this data format, also called URI, can be sorted by UID embedded in each IoT device. The manufacturer is able to use UID or URI immediately pull the data format of the subject IoT device from the System to verify as part of registration procedure through a function call.

Applications Integrate and Invoke

When Application is assigned a new IoT device with an UID, it can obtain the data format of this IoT device from the System as using dictionary to find the meaning of unknown command format. It can invoke this IoT device with proper data format and parameters, command code via the dictionary at run time. It is assume that the Application is an Internet based application deployed with web service class that allows communication with other computer and/or devices on the network via common data formats and protocols, such as XML, JSON, and HTTP. The detailed steps illustrated are as follows:

1. Application receives a new IoT device via UID. Application, then, uses HTTP get request to fetch the IoT device data format, command structure, and parameters from the System.
2. The System receives the request and retrieves the data format, command structure, and parameters from its database according to UID.
3. The System uses HTTP post request to send required data format, command structure, and parameters package as XML/JSON file back to the Application.
4. The Application extract the command code, format, and parameter layout from XML received from the System. Based on the role of this new IoT device in the solution of the Application offering, the Application makes a function call via HTTP get request to the System, where the function is a file of command code and parameters packaged in a XML/JSON format.
5. The System obtains the request from the Application, invokes a specific IoT device command associated with parameters assigned by the Application via XML/JSON file. The command can be control the IoT device or inquiry information on the site. The control status and/or information will return and package by the System as XML/JSON format. The System uses HTTP post request to send results to the Application.
6. The Application receives the call return value which may be the status of IoT device, command return value, and data. This information will be integrated in the Solution.

The System can offer a function library to wrap up step 1-6 above with a universal APIs according to the device type. It makes the Application totally independent from the devices to be controlled and actuated. It gives the Application ability to automatically adapt a new IoT device as long as its type has been registered such as an IoT device for temperature.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method for electronically obtaining instruction commands for an electronic device comprising the steps of:
   creating an accessible database for storage of information on a plurality of electronic devices;
   registering a new manufactured electronic device comprising the steps of:
      assigning the new manufactured electronic device a unique ID code;
      obtaining instruction commands for operation of the new manufactured device;
      correlating the assigned unique ID code with the instruction commands for the new manufactured electronic device; and
      storing the correlated instruction commands and unique ID code for the new manufactured electronic device in the accessible database;

receiving an electronic request for instruction commands from an entity for an unknown electronic device, the request including an ID code for the unknown electronic device;

checking for a match between the ID code received for the unknown electronic device and assigned unique ID codes stored in the database;

designating an unknown electronic device with a matched ID code as an identified electronic device; and releasing the instruction commands correlated to the matched ID code from the database for the identified electronic device to the entity.

2. The method of claim 1, wherein the database is cloud-based.

3. The method of claim 1, wherein the step of registering further comprises the step of storing information related to device type, data format, and command structure for the new manufactured electronic device.

4. The method of claim 1, wherein the information is stored in a computer readable format.

5. The method of claim 1, further comprising the step of providing feedback to a manufacturer of a registered new electronic device.

6. The method of claim 1, wherein the step of receiving a request comprises the step of using a web service to communicate with an online application through a single point of access interface via an HTTP get request.

7. The method of claim 6, wherein the step of releasing instruction commands comprises the step of using a post request via the web service HTTP to the device on the network.

8. The method of claim 6, further comprising the step of building a function library in the database having a set of universal programming interfaces (APIs) which are able to control and actuate remote devices independent of manufacturer.

9. The method of claim 1, further comprising the step of accessing the database to:

(1) provide an information management and retrieve server acting as a dictionary and use a web service to communicate with online applications using a single point of access interface via HTTP get request which can directly access and retrieve the server in the System for a specific instruction set of a new device, and post request via its web service HTTP to the device on the network to control and actuate; and (2) build function library which offers the online application a set of universal programming interfaces (APIs) embedded in the applications so that the application is able to use them to control and actuate remote devices independent of manufacturer.

10. The method of claim 1, further comprising the step of verifying qualifications of a manufacturer of a new manufactured electronic device.

11. The method of claim 8, further comprising the step of confirming unique IDs are unique across various fields and industries so that the universal APIs can use them to access correct command instructions through proper HTTP get request.

12. The method of claim 1, further comprising the step of incrementally updating instruction commands for identified devices.

13. The method of claim 12, wherein the step of updating comprises the steps of:

obtaining a version history of identified electronic devices in service;

assigning proper functions according to specific versions of identified electronic devices;

uploading embedded driver software to identified electronic devices without interrupting service; and maintaining legacy device functions while updating new functions to control and actuate new update devices.

14. The method of claim 1, further comprising the step of removing an identified electronic device from the system.

15. The method of claim 1, further comprising the step of obtaining status information on identified electronic devices which are in services.

* * * * *